US008751928B2

(12) United States Patent  
Sun et al.

(10) Patent No.: US 8,751,928 B2
(45) Date of Patent: Jun. 10, 2014

(54) RENDERING MULTI-LINGUAL TEXT BY CREATING BIT MAP FILES AND DETERMINING FONT BINDINGS

(75) Inventors: Yanlin Sun, Shanghai (CN); Roy Gu, Shanghai (CN)

(73) Assignee: SAP AG, Walldorf (DE)

( * ) Notice: Subject to any disclaimer, the term of this patent is extended or adjusted under 35 U.S.C. 154(b) by 1029 days.

(21) Appl. No.: 12/724,381

(22) Filed: Mar. 15, 2010

(65) Prior Publication Data

US 2011/0213608 A1    Sep. 1, 2011

(51) Int. Cl.
*G06F 17/00*    (2006.01)

(52) U.S. Cl.
USPC .......................................... 715/264; 715/269

(58) Field of Classification Search
CPC ..................................................... G06F 17/214
USPC .................................................. 715/264, 269
See application file for complete search history.

(56) References Cited

U.S. PATENT DOCUMENTS

| 7,243,335 | B1 * | 7/2007 | Andrew et al. | 717/115 |
| 2002/0010725 | A1 * | 1/2002 | Mo | 707/530 |
| 2005/0105118 | A1 * | 5/2005 | Yoshida | 358/1.13 |
| 2006/0075341 | A1 * | 4/2006 | Lin et al. | 715/542 |
| 2008/0306916 | A1 * | 12/2008 | Gonzalez et al. | 707/3 |
| 2009/0198647 | A1 | 8/2009 | Tong | |

OTHER PUBLICATIONS

Hellevi Ruonammaa, Software Localization to China and Chinese, 2006, pp. 1-47.*
Sun Microsystems, Inc., "Internationalization Enhancements", http://java.sun.com/j2se/1.5.0/docs/guide/intl/enhancements.html, 2 pages, 2004.
Microsoft Corporation, "Fonts and Text", http://msdn.microsoft.com/en-us/library/dd144819 (VS.85,printer).aspx, 1 page, Nov. 16, 2009.

* cited by examiner

*Primary Examiner* — Doug Hutton, Jr.
*Assistant Examiner* — Andrew McIntosh
(74) *Attorney, Agent, or Firm* — Mintz Levin Cohn Ferris Glovsky and Popeo, P.C.

(57) ABSTRACT

Multi-lingual text is rendered by creating bit map files and by determining font bindings. In particular, a font property file is specified. Font bit map files are created based upon the font property file. An input file with multi-lingual text is received. The font bit map files are accessed to determine font bindings for characters within the input file. Related methods, apparatus, systems, and articles are also described.

16 Claims, 4 Drawing Sheets

Font Property File

Language 1
        Typeface Category 1        Font A
        Typeface Category 2        Font B
        •
        •
        •
    Language N
        Typeface Category A        Font X
        Typeface Category B        Font Y
        •
        •
        •

FIG. 3

RENDERING MULTI-LINGUAL TEXT BY CREATING BIT MAP FILES AND DETERMINING FONT BINDINGS

FIELD OF THE INVENTION

This invention relates generally to the digital processing of text files. More particularly, this invention relates to optimal representations of multi-lingual text.

BACKGROUND OF THE INVENTION

As used herein, the term "font" refers to visible markings characterized by typeface and style. Typeface is a coordinated set of glyphs that establishes a consistent visual appearance for a family of characters, such as an alphabet of letters, numerals and punctuation marks. Common typefaces include Arial, Courier, Helvetica and Times New Roman. Style references the aesthetic representation of a typeface specified through one or more parameters, such as plain, boldface, italic, and underline. A typeface category is a schema for organizing typeface families. The schema may rely upon criteria such as serif, sans serif, proportional and mono-space. Serifs are end strokes within letters. San serif characters omit end strokes within letters. For example, Times New Roman is a serif font, while Helvetica is a san serif font. A proportional typeface contains glyphs of varying widths. A mono-spaced (non-proportional) typeface uses a single standard width for all glyphs.

A Hyper Text Markup Language (HTML) document includes tag delimited segments. A tag for a segment characterizes the font for the text in the segment. For example, an HTML file may have the following segment:

```
<pre style = "font-family: Sans-Serif">
English: Michael Jackson was the king of pop.
...
</pre>
```

The tag, marked by <>, specifies a typeface category or font-family of Sans-Serif. As a result, the text "English: Michael Jackson was the king of pop." will be rendered in accordance with this font family. The exact mapping of this font family (Sans-Serif) to an actual specific font (e.g., Arial, Courier) may be done by default or some other mapping, which may result in a sub-optimal output, particularly if the output is contrasted with other selected fonts for other languages in the multi-lingual input file.

Known techniques are used to convert an HTML file to a Portable Document Format (PDF) file. Similarly, known techniques may be used to convert text in an HTML file to a format suitable for a computer screen, print drivers or a publishing application. However, complications may arise in the event of multi-lingual text within an HTML file. For example, if an HTML file with multi-lingual text specifies a Times New Roman typeface, a resultant PDF file will accurately represent Latin character text, but not Chinese characters. Similar problems arise when the HTML file does not have clear font definitions. For example, the font definition may only specify a typeface category.

It is desirable to select fonts with a similar appearance when rendering multi-lingual text. That is, if clashing fonts are used for different languages in a multi-lingual file, then the resulting document is visually unpleasant.

In view of the foregoing, it would be desirable to provide improved techniques for rendering multi-lingual text.

SUMMARY OF THE INVENTION

A computer readable storage medium includes executable instructions, which when executed by a computer, cause the computer to specify a font property file. Font bit map files are created based upon the font property file. An input file with multi-lingual text is received. The font bit map files are accessed to determine font bindings for characters within the input file.

BRIEF DESCRIPTION OF THE FIGURES

The invention is more fully appreciated in connection with the following detailed description taken in conjunction with the accompanying drawings, in which:

FIG. 3 illustrates a font property file utilized in accordance with an embodiment of the invention.

Like reference numerals refer to corresponding parts throughout the several views of the drawings.

DETAILED DESCRIPTION OF THE INVENTION

Figure 1:
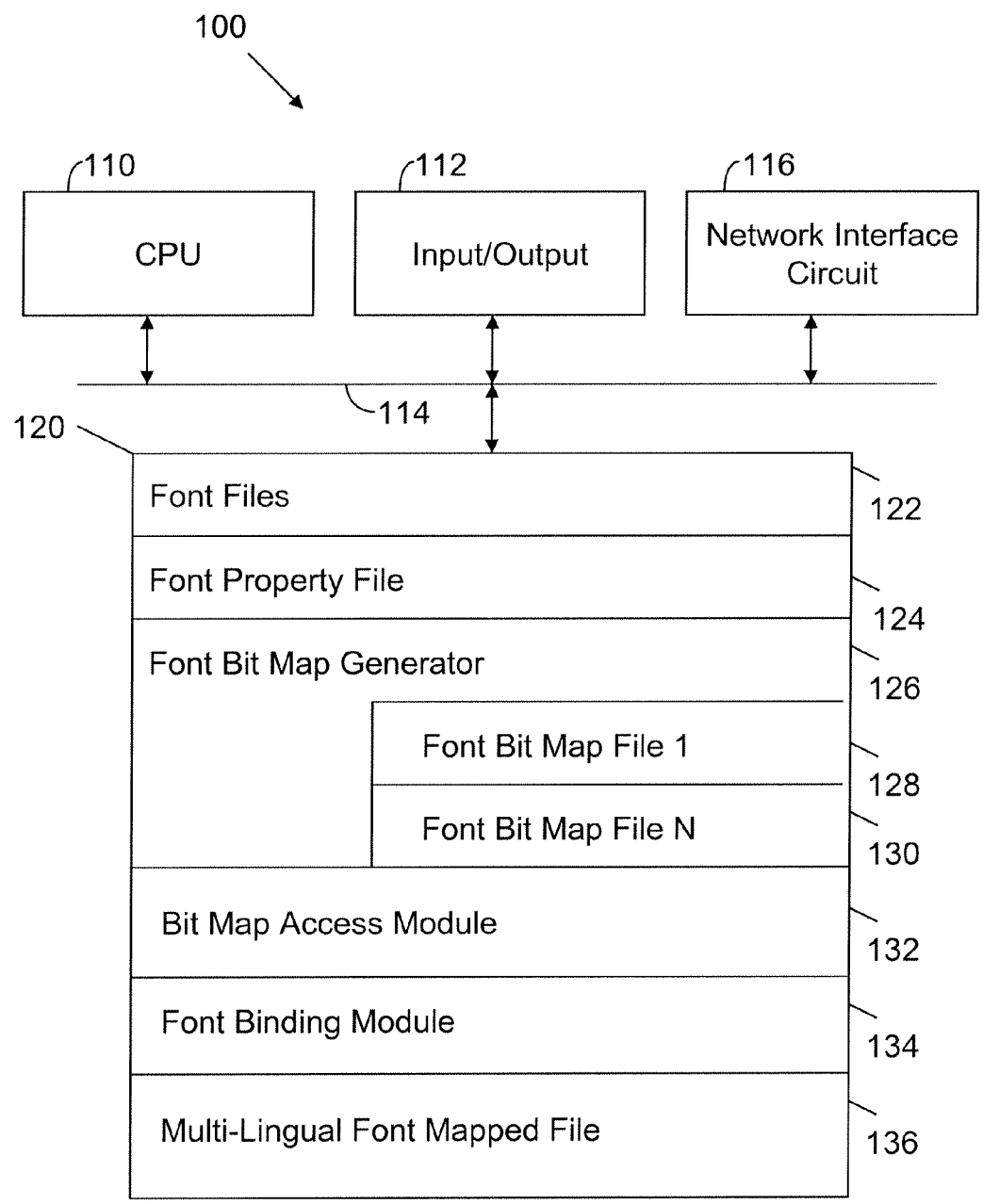
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices 112 may include a keyboard, mouse, display, printer and the like. A network interface circuit 116 is also connected to the bus 114. The network interface circuit 116 provides connectivity to a network so that the computer 100 may operate in a networked environment.

A memory 120 is also connected to the bus 114. The memory 120 includes executable instructions to implement operations of the invention. The memory 120 includes a set of font files 122, such as those associated with an operating system. Each font file provides instructions for rendering a specified font.

In accordance with an embodiment of the invention, the memory 120 also stores a font property file 124. The font property file 124 expresses font binding information for multiple languages. That is, the font property file 124 specifies fonts to be used for different languages in order to optimize the appearance of multi-lingual text. For example, the font property file 124 may specify the appropriate fonts to use for different languages. These font selections may be made in the context of considering how fonts from multi-lingual text will appear with one another.

The memory also stores a font bit map generator module 126. The font bit map generator 126 includes executable instructions to form a font bit map file for each font file 122 in the system. The font bit map generator 126 accesses the font property file 124 to generate a set of font bit map files 128, 130. Each font bit map file expresses whether a character in an input file should be rendered with the font or typeface category expressed in the input file. In this way, the preferences expressed in font property file 124 are enforced through the font bit map files.

The bit map access module 132 includes executable instructions to prioritize access to a sequence of font bit map files. As discussed below, priority to font bit map files is predicated on the likelihood of the relevance of certain font bit map files to a given input file.

The font binding module 134 includes executable instructions to process individual segments of an input file to determine the appropriate fonts for the segments. The font binding module 134 sequentially accesses the prioritized font bit map files to find appropriate bindings. If the segment-to-font mapping is appropriate, then the mapping is maintained. Otherwise, additional font bit map files are processed to identify the appropriate segment-to-font mapping, as discussed below. This processing results in a multi-lingual font mapped file 136.

Figure 2:
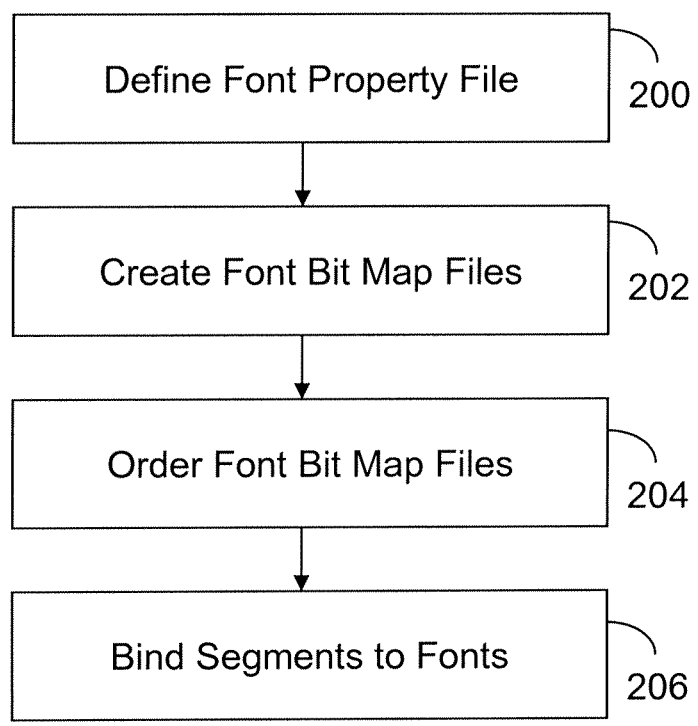
FIG. 2 illustrates overall processing operations associated with an embodiment of the invention.

FIG. 2 illustrates processing operations associated with an embodiment of the invention. Initially, a font property file is defined 200. FIG. 3 illustrates an exemplary font property file. The property file lists a number of languages. For each language different typeface categories are enumerated. For a given typeface category, an appropriate font is specified. In this way, a user enforces font selection for segments or characters in a given language. Consider the following specific example where the language is expressed as Latin and specific fonts (typeface and style) are assigned to different typeface categories:

Latin
  serif.plain=Times New Roman
  serif.bold=Times New Roman Bold
  serif.italic=Times New Roman Italic
  serif.bolditalic=Times New Roman Bold Italic
  sanserif.plain=Arial
  sanserif.bold=Arial Bold
  sanserif.italic=Arial Italic
  sanserif.bolditalic=Arial Bold Italic
  monospaced.plain=Courier New
  monospaced.bold=Courier New Bold
  monospaced.italic=Courier New Italic
  monospaced.bolditalic=Courier New Bold Italic
  sequence.allfonts=LATIN, DINGBATS, SYMBOL Now consider another example where the language is expressed as Chinese. Once again, specific fonts are assigned to different typeface categories.

Chinese
  serif.plain=SimSun
  serif.bold=SimSun
  serif.italic=SimSun
  serif.bolditalic=SimSun
  sanserif.plain=SimHei
  sanserif.bold=SimHei
  sanserif.italic=SimHei
  sanserif.bolditalic=SimHei
  monospaced.plain=SimSun
  monospaced.bold=SimSun
  monospaced.italic=SimSun
  monospaced.bolditalic=SimSun
  charsets=GB2312, GBK, GB18030, cp936
  locales=CN
  sequence.serif=LATIN, SIMPLIFIED-CHINESE, DINGBATS, SYMBOL
  sequence.sanserif=LATIN, SIMPLIFIED-CHINESE, DINGBATS, SYMBOL
  sequence.monospaced=SIMPLIFIED-CHINESE, LATIN, DINGBATS, SYMBOL In this instance, the font property file specifies character sets (charsets) and locales (CN) that may be associated with an input document. This information allows one to identify a language used within an input. This language information can then be used to map appropriate fonts.

Returning now to FIG. 2, the next processing operation is to create font bit map files 202. As previously indicated, the font bit map generator 126 may be used to create the font bit map files. In one embodiment, each Unicode character is assigned one bit to specify whether a font can or cannot be displayed (e.g., a 0 value means no, a 1 value means yes). Unicode is a computing industry standard that allows computers to consistently represent and manipulate text expressed in the world's writing systems. There are 65536 (0xFFFF) bits, resulting in a final bit map size of 8K. In one embodiment, the map starts with the character U+0000 and ends at the character U+FFFF. Thus, the numeric value of the Unicode character is the offset into the bit map. For example, the Latin small letter "a" has a Unicode value of U=0061. Therefore, the $61^{st}$ bit in the map indicates whether the font can be displayed.

The font bit map generator may use code corresponding to the following pseudo code:

```
Load a font
create an array of zeroes //which can hold the 65536 bit values
for each int from 0 to 65535 {
    cast int into char
    if font.canDisplay(char)
        set array element at position int to 1
}
save array to physical file, name it as <font_name>.bmp
```

The method call "font.canDisplay(char)" may reference information in the font property file 124 to determine whether the mapping is appropriate. This processing is repeated for each font, resulting in a set of font bit map files 128, 130.

The next processing operation of FIG. 2 is to order font bit map files 204. The bit map access module 132 may be used for this operation. It is desirable to order the bit map files so that fonts that are likely relevant to an input document are processed first. The bit map access module 132 may prioritize font bit map files on the basis of the encoding of the input document. For example, a document encoded in GB2112 is probably a document in Chinese. Therefore, fonts commonly used with Chinese characters are prioritized. That is, the corresponding font bit map files for Chinese characters are prioritized. The locale of the machine may also be used to order the font bit map files. For example, a server with the locale zh_CN is likely to contain mostly Chinese character documents. Alternately, some other default schema may be used to prioritize the access and processing of the font bit map files.

Figure 4:
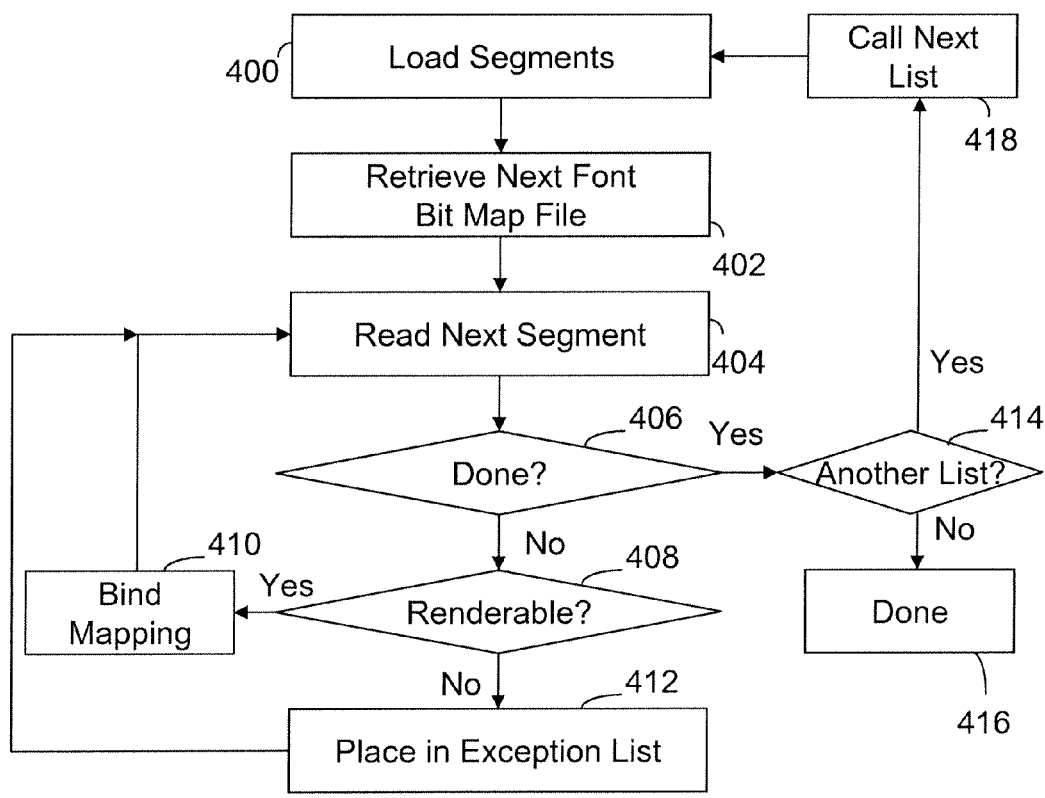
FIG. 4 illustrates segment and font bit map file processing operations performed in accordance with an embodiment of the invention.

The final processing operation of FIG. 2 is to bind tag delimited document segments. The font binding module 134 may be used to implement this operation. FIG. 4 illustrates processing operations associated with an embodiment of the font binding module 134. Initially, segments of an input file are loaded 400. On the first pass, the highest priority bit file map is retrieved for processing 402. A segment from the input file is read 404. A check is then made to determine if the last segment has been read 406. On the first pass this will not be the case, so processing proceeds to block 408, which determines whether the segment can be rendered in the specified font. This entails the font binding module 134 accessing the location in the font bit map file for the character of a segment.

If the location indicates that the character can be rendered in the specified font (e.g., the font bit map file position is set to 1), then the mapping is bound 410. If not (408—No), then the segment is placed in an exception list 412. This means that another font will be selected to map the segment. Control then returns to block 404. This processing is repeated until the last segment is read (406—Yes). If an exception list exists (414—Yes), the list is called 418 and segments are loaded 400. The next font bit map file is then retrieved 402. Each segment is then processed through blocks 404-410. If this processing results in another exception list, then the next list is called 418 and loaded 400. Another font bit map file is then invoked 402. The processing of blocks 404 through 410 is then repeated until no other exception lists are generated (414—No). At this point, the processing is completed 416. Observe that FIG. 4 demonstrates an iterative processing of exception lists with different font bit map files.

Now each segment of the multi-lingual input file is mapped to an appropriate font. Ideally, the font property file 124 specified harmonized fonts for the multi-lingual input file. Consequently, the rendered text, whether via a PDF file, a screen output, or print driver input, has a harmonized look. Further, the rendered text is optimized for each language and avoids the problem of invoking a font that cannot be used to render a character in a given language.

Observe that the invention relies upon the processing of font bit map files, which are much smaller than their corresponding font files (e.g., 8K vs. 25M). Thus, the invention's reliance upon font bit map files improves font rendering performance. Indeed, because of their small size, the font bit map files may be placed in cache to further enhance system performance. The invention's reliance upon bit lookups in a font bit map file is much faster than processing a font file.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium comprising executable instructions, which when executed by a computer, cause the computer to:
specify a font property file;
create font bit map files based upon the font property file, wherein each of the font bit map files corresponds to a specified font and indicates whether a particular non-Latin character can be rendered in the specified font;
prioritize access to the font bit map files;
receive an input file with multi-lingual text, wherein the multi-lingual text includes Latin characters and non-Latin characters;
access the font bit map files according to the prioritized access; and
determine appropriate font bindings for the characters within the input file.

2. The computer readable storage medium of claim 1, wherein the font property file specifies a plurality of languages, wherein, for each language of the plurality of languages, typeface categories are mapped to fonts.

3. The computer readable storage medium of claim 1, wherein the input file has tag delimited segments.

4. The computer readable storage medium of claim 1, wherein the executable instructions to prioritize access include executable instructions to prioritize access to the font bit map files based upon the encoding of the input file.

5. The computer readable storage medium of claim 1, wherein the executable instructions to prioritize access include executable instructions to prioritize access to the font bit map files based upon the locale of the machine supplying the input file.

6. The computer readable storage medium of claim 1, wherein the executable instructions to prioritize access include executable instructions to prioritize access to the font bit map files based upon a default schema.

7. The computer readable storage medium of claim 1, wherein the executable instructions to access include executable instructions to retrieve a selected font bit map file.

8. The computer readable storage medium of claim 7, wherein the executable instructions to access include executable instructions to read a segment from the input file.

9. The computer readable storage medium of claim 8, wherein the executable instructions to access include executable instructions to determine from the selected font bit map file whether the segment can be rendered, if so, bind the segment to the font, if not, place the segment in an exception list.

10. The computer readable storage medium of claim 9, wherein the executable instructions to access include executable instructions to invoke a new font bit map file and to determine from the new font bit map file whether an exception list segment can be rendered.

11. The computer readable storage medium of claim 1, further comprising executable instructions to map the font bindings into a Portable Document Format (PDF) file.

12. The computer readable storage medium of claim 1, further comprising executable instructions to map the font bindings to a print driver.

13. The computer readable storage medium of claim 1, further comprising executable instructions to map the font bindings to a computer screen.

14. The computer readable storage medium of claim 1, further comprising executable instructions to map the font bindings to a publishing application.

15. A method for implementation by one or more data processors comprising:
- specifying, by at least one data processor, a font property file;
- creating, by at least one data processor, font bit map files based upon the font property file, wherein each of the font bit map files corresponds to a typeface category and indicates whether a particular non-Latin character can be rendered in the typeface category, wherein the font bit map files enumerate different typeface categories for each language;
- prioritizing access to the font bit map files;
- receiving, by at least one data processor, an input file with multi-lingual text, wherein the multi-lingual text includes Latin characters and non-Latin characters;
- accessing, by at least one data processor, the font bit map files according to the prioritized access; and
- determining appropriate font bindings for characters within the input file.

16. A method for implementation by one or more data processors comprising:
- specifying, by at least one data processor, a font property file;
- creating, by at least one data processor, font bit map files based upon the font property file, wherein each of the font bit map files corresponds to a specified font and indicates whether a particular non-Latin character can be rendered in the specified font;
- prioritizing access to the font bit map files based on a locale of a server receiving the input file;
- receiving, by at least one data processor, an input file with multi-lingual text, wherein the multi-lingual text includes Latin characters and non-Latin characters;
- accessing, by at least one data processor, the font bit map files according to the prioritized access; and
- determining appropriate font bindings for characters within the input file.

* * * * *